United States Patent [19]

Jenneman et al.

[11] Patent Number: 5,360,064
[45] Date of Patent: * Nov. 1, 1994

[54] INJECTION OF ORGANIC PHOSPHATES FOR SUBTERRANEAN MICROBIAL PROCESSES

[75] Inventors: Gary E. Jenneman; J. Bennett Clark, both of Bartlesville, Okla.

[73] Assignee: Phillips Petroleum Company, Bartlesville, Okla.

[*] Notice: The portion of the term of this patent subsequent to Jan. 28, 2009 has been disclaimed.

[21] Appl. No.: 995,278

[22] Filed: Dec. 22, 1992

[51] Int. Cl.$^5$ ............................................. E21B 43/22
[52] U.S. Cl. ...................................... 166/246; 166/273
[58] Field of Search ..................... 166/246, 273, 274; 210/170, 747, 610, 611; 405/128; 435/243, 252.1, 281

[56] References Cited

U.S. PATENT DOCUMENTS

| | | | |
|---|---|---|---|
| 3,032,472 | 5/1962 | Hitzman | 195/3 |
| 4,450,908 | 5/1984 | Hitzman | 166/246 |
| 4,460,043 | 7/1984 | Thompson et al. | 166/246 |
| 4,475,590 | 10/1984 | Brown | 166/246 |
| 4,522,261 | 6/1985 | McInerney et al. | 166/246 |
| 4,534,412 | 8/1985 | Dovan et al. | 166/295 |
| 4,552,217 | 11/1985 | Wu et al. | 166/270 |
| 4,558,739 | 12/1985 | McInerney et al. | 166/246 |
| 4,610,302 | 9/1986 | Clark | 166/246 |
| 4,732,680 | 3/1988 | Weaver et al. | 210/610 |
| 4,799,545 | 1/1989 | Silver et al. | 166/246 |
| 4,800,959 | 1/1989 | Costerton et al. | 166/246 |
| 4,905,761 | 3/1990 | Bryant | 166/246 |
| 4,906,575 | 3/1990 | Silver et al. | 435/253.6 |
| 4,941,533 | 7/1990 | Buller et al. | 166/252 |
| 4,947,932 | 8/1990 | Silver et al. | 166/246 |
| 4,971,151 | 11/1990 | Sheehy | 166/246 |
| 4,979,564 | 12/1990 | Kalpakci et al. | 166/273 |
| 4,991,652 | 2/1991 | Hoskin et al. | 166/270 |
| 5,083,611 | 1/1992 | Clark et al. | 166/246 |

*Primary Examiner*—George A. Suchfield
*Attorney, Agent, or Firm*—Cynthia L. Stokes

[57] ABSTRACT

The present invention provides a process for sustaining microbial activity in subterranean formations which comprises introducing as a microbial nutrient, an organic phosphate, This process may include the sequential injection of sources of individual nutrient components which are deficient in said subterranean formation, whereby the injected phosphorus source is an organic phosphate.

7 Claims, No Drawings

INJECTION OF ORGANIC PHOSPHATES FOR SUBTERRANEAN MICROBIAL PROCESSES

This invention relates to the use of organic phosphates as nutrients in a method for sustaining microbial activity in subterranean formations.

BACKGROUND

In many subterranean microbial processes, nutrient selection and injection are controlling factors to successful operations. The microorganisms utilized must be nutritiously sustained and metabolically active and thus able to achieve their specific objective.

Numerous microorganisms suitable for achieving various microbial objectives in subterranean formations are known in the art. In order to achieve a specific microbial objective, suitable microorganisms can be selected and injected into the subterranean formation. Oftentimes, however, endogenous microorganisms well suited for achieving a particular microbial objective are already present within the formation.

Recently, a method was disclosed by Clark, et al. (U.S. Pat. No. 5,083,611 assigned to Phillips Petroleum Company), which overcame many problems associated with microbial nutrient injection methods then known to the art. This newly disclosed method provides for the sequential injection into a subterranean formation of sources of individual nutrient components which are deficient in the subterranean formation so that a complete nutrient medium capable of sustaining substantial microbial activity is formed in the subterranean formation upon injection of the last nutrient source. Each of the nutrient sources is comprised of at least one of the deficient individual nutrient components. Further, each of the nutrient sources, up to and including the next to the last nutrient source injected, is injected in an amount such that at least one individual nutrient component contained therein is retained in the subterranean formation in an amount sufficient for achieving the desired in-situ microbial objective.

The above method prevents the excessive utilization and depletion of nutrient components by microorganisms located in the vicinity of the borehole and also takes advantage of chromatographic retention in order to achieve nutrient media distribution beyond the proximity of the borehole. However, it has been discovered and is disclosed by the present application, that in order to achieve biomass production (i.e. microbial growth and/or exopolymer production) to plug high permeability zones within subterranean formations, a specific phosphorus source when used in the method of U.S. Pat. No. 5,083,611 exhibits greater plugging potential than others presently used. The phosphorus source of the present invention is an organic phosphate which is used in combination with a carbon source, and provides for an unexpected increase in a capacity for the desired plugging, due to the ability of said phosphorus source to be more easily transported. The ability of the nutrients to be transported in-depth is therefore of great importance. Some problems associated with the use of known phosphorus sources such as inorganic phosphates is their tendency to complex with divalent cations within the reservoir which results in poor solubility and heightened difficulty transport distal to the wellbore. Also, inorganic polyphosphates hydrolyze at higher temperatures which render them less soluble in hard brines characterized by such temperatures. Thus, the specific use of organic phosphates as the phosphorus source in the above method, significantly contributes to the art of practicing said method.

It is therefore an object of this invention to provide a phosphorus source for use in the state-of-the art nutrient injection for subterranean microbial processes which provides for greatly enhanced transportability and thermal stability of the phosphorus nutrient.

These and other objects of the present invention will become apparent upon inspection of the disclosure and the claims herein provided.

SUMMARY OF THE INVENTION

In accordance with the present invention, we have discovered that when injected as the phosphorus source in subterranean microbial processes, organic phosphates are more readily transportable than those known in the art and are thermally stable, thus allowing biological activity to be achieved.

A process is therefore provided for sustaining microbial activity in subterranean formations which comprises introducing as a microbial nutrient, an organic phosphate.

DETAILED DESCRIPTION

The phosphorus nutrient injection system disclosed herein can generally be used in conjunction with any process wherein microbial activity is induced in a subterranean formation. Examples of such processes include microbial enhanced oil recovery, (MEOR) processes used in oil-bearing subterranean formations, and bioremediation processes used in aquifers. Typical microbial enhanced oil recovery processes include those wherein microorganisms are used to alter subterranean formation permeability and those wherein microorganisms are used for in-situ generation of chemicals useful for enhanced oil recovery. Examples of in-situ generated chemicals include water-soluble polymers, surfactants, solvents such as ethanol and acetone, acids, carbon dioxide, etc.

The present inventive nutrient combination of an organic phosphate and a carbon source is particularly well suited for use in conjunction with MEOR processes for improving the volumetric sweep efficiency of subterranean formations. Oil-bearing subterranean formations contain porous rock with heterogenous zones of permeability. Water, used to mobilize oil in a waterflood, preferentially invades the high permeability zones due to these zones' decreased resistance to flow. This causes large reserves of oil, contained in the lower permeability regions, to be bypassed. In microbial enhanced oil recovery processes, nutrients are fed to microorganisms located in high permeability formation zones. The nutrients stimulate the microorganisms and cause the microorganisms to generate an increased biomass. This increased biomass results from cell growth and/or the biological production of polymer(s). Once the high permeability formation zones have been plugged, water is diverted to the previously uninvaded low permeability zones and thereby displaces oil contained in the low permeability zones.

The microorganisms used in conjunction with the present invention are selected for the attainment of a desired microbial objective and then injected into the subterranean formation. Preferably, such microorganisms when used, are injected into the formation prior to nutrient injection. As is known in the art, the particular microorganisms chosen for injection should be tolerant of the conditions, e.g., temperature, pH, salinity etc., existing in the formation. Microorganisms can be injected into subterranean formations using methods which are well known in the art. The preferred microorganism injection method will depend upon the microorganism(s) chosen, and the specific characteristics of the formation. Oftentimes, endogenous microorganisms capable of achieving a desired microbial objective are already present within the subterranean formation. In order to cause the microorganisms within a subterranean formation, whether endogenous or injected, to produce a desired in-situ result, deficient nutrient components are injected into the formation which facilitates the regulation of where, in the formation, a complete nutrient package is formed and hence microbial activity occurs. Deficient nutrient components are those individual nutrient components which are needed by the microorganisms for achievement of a desired microbial objective and which are not already present within the formation in amounts sufficient for achieving the microbial objective. Subterranean formations are typically deficient in either phosphorus, nitrogen, or carbon nutrients, or combinations thereof. Suitable phosphorus sources and nitrogen sources (e.g., ammonium-containing compounds such as ammonium chloride, nitrates such as potassium nitrate, and organic nitrogen sources such as amino acids and peptides), as well as carbon sources (e.g., fats, proteins, simple carbohydrates and complex carbohydrates), and other nutrient sources which are suitable for use in nutrient injection methods are well known in the art. However, selection of a phosphorus source which is sufficiently deficient in carbon and nitrogen and which causes increased in-situ biomass production at depths of penetration where plugging is most desirable is extremely beneficial in the practice of the above method. The inventive use of organic phosphates as the phosphorus source results in an unexpected increase in microbial activity at desired plugging sites due to the ability of the organic phosphate to be easily transported and to maintain a high thermal stability.

The term organic phosphate as used herein, refers to any compound or mixture of compounds containing the general molecular structure of phosphoric or polyphosphoric acid namely, $[(HO)_3PO]_n$, in which at least one hydrogen atom is replaced by an organic residue; and n is a number from 1 to about 10. Thus, the organic phosphate of the present invention can either originate as a monophosphoric acid or a polyphosphoric acid in which the phosphoric acid residues are covalently linked e.g.

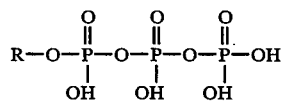

The organic residues include but are not limited to alkyl groups, and preferred organic residues are those having the carbon content of 1 to about 17 carbon atoms per molecule. Organic residues are linked to the phosphorus atom via an ester bond. Examples of appropriate organic residues include but are not limited to methyl, ethyl, butyl, carbohydrates, proteins, peptides and lipids.

The carbon source to be used in combination with an organic phosphate phosphorus source should be in a substantially phosphorus-nutrient-free solution. Also, the organic phosphate should be in a substantially carbon-nutrient-free solution, i.e., a solution sufficiently deficient in carbon to render it unusable as a carbon source by the targeted microorganisms. This is to avoid achieving a complete nutrient combination and thus microbial activity prior to locating the nutrients in a position in the subterranean formation where microbial activity is most desired. Therefore it is advantageous to first inject a phosphorus solution of organic phosphate which is more readily retained in the subterranean formation and thereafter inject a substantially phosphorus-nutrient-free carbon solution. This permits deep penetration of the phosphorus prior to the injection of the carbon source which has less retainability in the subterranean formation. The carbon nutrient solution, being substantially phosphorus free will ultimately catch up to the previously injected phosphorus solution and form a complete nutrient combination deep within the subterranean formation. Microbial activity will occur where a complete nutrient combination exists and thus where such activity is most desired. Such method is well suited for enhancing oil recovery from oil-bearing subterranean formations.

The following example has been provided merely to illustrate the practice of the invention and should not be read as to limit the scope of the invention or the appended claims in any way.

EXAMPLES

Example I

Three screening criteria were used to determine the preferred use of organic phosphates vs. inorganic phosphate as sources of phosphorus for biological growth and metabolism. The criteria screened included the ability of the compound to support growth, the adsorption of the compound to rock, and the precipitation of the compound in the brine.

All tests were performed with field brine collected from a skimmer tank at the tract 5 tank battery located at the North Burbank Unit, Osage County, Okla. Burbank brine is typical of many highly mineralized, oil-reservoir brines in that a large percentage of the solids are sodium and calcium salts (Table 1). The temperature of the brine under reservoir conditions is between 40° and 45° C. which is moderate for many oil reservoirs. Brine samples were collected in glass bottles pre-incubated in an anaerobic glove box to remove oxygen. Bottles were capped with a butyl rubber septum. The septum was penetrated with a 22 gauge hypodermic needle attached to a ¼ inch (ID) nylon tubing that was used to transmit the brine sample into the bottle. Bottles of brine were transported back to the lab the same day and placed in the anaerobic glove box.

TABLE 1

| Chemical Analysis of Injection Brine from the Tract 5 Tank Battery at the North Burbank Unit | |
|---|---|
| Analyte | Concentration (g/L) |
| ammonium | .033 |
| nitrate | <.005 |
| nitrate | <.005 |
| sulfate | .020 |
| phosphate | <.050 |
| total organic carbon | .025 |
| calcium | 6.290 |
| barium | .755 |
| magnesium | 1.250 |
| sodium | 31.000 |
| chloride | 63.000 |

TABLE 1-continued

Chemical Analysis of Injection Brine from the
Tract 5 Tank Battery at the North Burbank Unit

| Analyte | Concentration (g/L) |
|---|---|
| iron | .0168 |
| total dissolved solids | 127.300 |

Adsorption Screen

Brine was filtered through a 0.22 micron membrane filter and enough organic phosphate ester (OPE) compound added to the brine to get a final phosphorus concentration of approximately 100 mg/L. This solution was added to a serum bottle containing 1 gram of crushed and sieved Burbank rock. The bottle was stoppered with a butyl rubber stopper and placed on a New Brunswick orbital shaker-incubator at 40° C. In a like manner, sodium trimetaphosphate (STMP), an inorganic polyphosphate, was added to another bottle containing crushed rock and brine and incubated at 40° C.

After 72 hours incubation the sample was filtered to remove the rock and the filtrate assayed for phosphorus. The phosphorus was detected using inductively coupled plasma analysis. The phosphorus detected in the filtrate is indicative of the amount of non-adsorbing or non-retained phosphorus compound after equilibration with the rock.

An index was established that compares the efficacy of the test OPE to an inorganic phosphate, i.e., STMP. STMP was found to be more soluble in this brine as compared to other inorganic phosphates tested (e.g. sodium and potassium phosphates as well as pyrophosphates); however, its propensity to chemically degrade, at the temperature tested, to the highly insoluble orthophosphate made it an unattractive candidate. Therefore, STMP became a standard by which to gauge the effectiveness of other test compounds, that is, effective compounds would have to display properties superior to STMP to in terms of adsorption or retention and chemical stability (i.e. precipitation).

The adsorption index (AI) was defined as the amount of STMP phosphorus adsorbed by 1.0 gram of rock at 40° C. divided by the amount of OPE adsorbed per gram of rock at 40° C. An AI greater than 1.0 indicates the test compound relative to STMP is superior in terms of its inability to be retained by the rock. Subsequently, all compounds that were retained less than STMP were considered preferred candidates for transport through the rock matrix. As can be seen in Table 2, all OPEs tested had AIs greater than 1.0.

Precipitation Screen

Samples were prepared as above for the adsorption screen except that no crushed rock was present in the bottles and the samples were held at 40° C. for 23 days instead of 3 days. The long term precipitation index (LTPI) is defined as the weight of dissolved phosphorus in the brine after 23 days divided by the weight of dissolved phosphorus in deionized water after 3 days at room temperature. The LTPI is a measure of the chemical stability of the test compounds. Those compounds that are less likely to precipitate in brine at the higher temperature are those that have LPTIs close to 1.0. Table 2 shows that all the OPEs tested has LTPIs close to 1.0 and greater than that for STMP. For the purposes of this screen all compounds with LPTIs greater than STMP were considered to be superior and thus preferred compounds.

TABLE 2

Adsorption and Long Term Precipitation Indices for Various Organic Phosphate Esters

| Organic phosphate ester | Source | AI | LTPI |
|---|---|---|---|
| Triethylphosphate | Kodak | 13.0 | 0.86 |
| Methyl acid phosphate | Albright-Wilson | 31.0 | 1.05 |
| Dimethyl acid pyrophosphate | Albright-Wilson | 1.08 | 0.88 |
| Ethyl acid phosphate | Akzo | 5.40 | 0.97 |
| Butyl acid phosphate | Akzo | 1.20 | 1.01 |
| Monomethylphosphate | Sigma | 65.0 | 0.90 |
| Sodium Trimetaphosphate | Monsanto | 1.0 | 0.64 |

Biological Screen

These screens were performed by adding 100 mL of unfiltered Burbank brine to sterile, 120 mL serum bottles. Additions were made in an anaerobic glove box to prevent contamination by oxygen. Glucose was added at a final concentration of 0.1 percent and a phosphorus compound added at a final concentration of 100 micromolar, as phosphorus. The bottles were stoppered with butyl rubber stoppers and incubated at 45° C. for two weeks. After incubation, the bottles were sampled and bacterial numbers determined as acridine orange direct counts (AODC). In addition, the pH of the sample was measured. A lowering of pH along with an increase in cell count is indicative of bacterial fermentation of the glucose. The phosphorus compound was considered to support growth if it could stimulate an increase in bacterial numbers and lower pH to levels comparable to that obtained by using glucose plus STMP. The results in Table 3 show that four OPE supported growth and pH declines similar to that of STMP. Therefore OPEs can better serve as effective phosphorus sources for biological growth when compared to the more commonly used inorganic phosphates.

TABLE 3

Comparison of the Ability of Organic Phosphate Esters vs. Inorganic Phosphate to Support Growth of Bacteria in Burbank Brine after two Weeks Incubation at 45° C.

| Phosphate ester | Source | pH* | AODC ($\times 10^8$)* bacteria/mL |
|---|---|---|---|
| Sodium Trimetaphosphate[a] | Monsanto | 5.0 | 1.5 |
| Alpha-glycerophosphate[a] | Sigma | 5.0 | 2.9 |
| Monomethyl phosphate[a] | Sigma | 5.05 | 1.2 |
| Ethyl acid phosphate[a] | Akzo | 5.1 | 1.85 |
| Methyl acid phosphate[b] | Albright-Wilson | 5.05 | 0.62 |
| Sodium Trimetaphosphate[b] | Sigma | 5.0 | 0.86 |

NOTE: Controls without a phosphorus source had average pH values of 6.1 and AODCs of .02 $\times 10^8$ bacteria/mL.
*averages for two replicates;
[a]results obtained with the same batch of brine collected on May 11, 1990;
[b]results obtained with the same batch of brine collected on August 13, 1990.

That which is claimed is:

1. In a process for sustaining microbial activity in subterranean formations comprising the steps of injecting a substantially carbon-nutrient-free first nutrient solution comprising a phosphorus nutrient source into said subterranean formation; and thereafter, injecting a substantially phosphorus-nutrient-free second nutrient solution comprising a carbon nutrient source into said subterranean formation, the improvement which comprises using as said phosphorus nutrient source an organic phosphate.

2. The process of claim 1 wherein said organic phosphate is a monophosphoric acid of the general formula $(HO)_3PO$ in which at least one hydrogen atom is replaced by an organic residue selected from an alkyl group.

3. The process of claim 2 wherein said alkyl organic residue is selected from the group consisting of those alkyl organic residues having from 1 to 17 carbon atoms per molecule.

4. The process of claim 1 wherein said organic phosphate is a polyphosphoric acid of the general formula $[(HO)_3PO]_n$ in which at least one hydrogen atom is replaced by an organic residue selected from an alkyl group.

5. The process of claim 4 wherein said polyphosphoric acid has the general formula $[(HO)_3PO]_n$ and $n$ is a number from 1 to about 10.

6. The process of claim 4 wherein said alkyl organic residue is selected from the group consisting of those alkyl organic residues having from 1 to about 17 carbon atoms per molecule.

7. The process of claim 1 wherein said subterranean formation is an oil-bearing subterranean formation and said process is used to enhance oil recovery.

* * * * *